(12) United States Patent
Koyama

(10) Patent No.: US 6,240,210 B1
(45) Date of Patent: *May 29, 2001

(54) IMAGE DECOMPRESSION SYSTEM CAPABLE OF REDUCING MEMORY CAPACITY

(75) Inventor: Motoaki Koyama, Yokosuka (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,371

(22) Filed: Dec. 23, 1997

(30) Foreign Application Priority Data

Dec. 24, 1996 (JP) .................................................. 8-343645

(51) Int. Cl.⁷ ................................. G06K 9/36; G06K 9/46
(52) U.S. Cl. ......................................... 382/233; 382/236
(58) Field of Search ................................... 382/233, 236, 382/250

(56) References Cited

U.S. PATENT DOCUMENTS 5,777,677 * 7/1998 Linzer et al. ......................... 382/233

OTHER PUBLICATIONS

Dave Galbi, et al., (International Solid State Circuits Conference 95)/Session 17/Video Signal Processing/Paper FA17.1: An MPEG–1 video (Video Decoder with Run–Length Compressed Antiallased Video Overlays, Jan. 1995, p. 286.

* cited by examiner

Primary Examiner—Phuoc Tran
(74) Attorney, Agent, or Firm—Oblon, Spivak, McClelland, Maier & Neustadt, P.C.

(57) ABSTRACT

An image decompression system comprises: a decoding element 2 including at least one decoding part for decoding an inputted compressed image by the same system as a coding system of the compressed image; a coding part 7 for encoding a decoded image, which has been decoded by the decoding part 7, to reproduce a compressed image; a compressed reference image storing part 9 for storing, as a reference image, the compressed image compressed by the coding part 7; and a first switching element 6 for selecting one of the decoded image outputted from the decoding part 3 and a decoded image decoded using a compressed reference image stored in the compressed reference image storing part 9. Thus, the memory capacity used for storing reference images can be greatly saved by compressing a decompressed image again by the same coding system regardless of the kind of image.

13 Claims, 14 Drawing Sheets

IMAGE DECOMPRESSION SYSTEM CAPABLE OF REDUCING MEMORY CAPACITY

BACKGROUND OF THE INVENTION

The present invention relates generally to an image decompression system for decoding and decompressing compression-coded image data. More specifically, the invention relates to an image decompression system for decoding and decompressing image data using the same system as a compression system.

The storage and coding for color moving pictures have been standardized by MPEGs (Moving Picture Expert Groups). The moving picture compression technique requires code data for buffering, reference images for the motion prediction, and images for display, as data to be stored in a memory. Among these data, the reference images and the display images have large data capacities. Therefore, it is effective to reduce these data capacities in order to reduce the costs of an image decompression system.

In general, ISSCC95 (International Solid State Circuits Conference 95)/SESSION 17/VIDEO SIGNAL PROCESSING/PAPER FA17.1: An MPEG-1 Audio/Video Decoder with Run-Length Compressed Antialiased Video Overlays, discloses that "1. Decoded B frames are compressed before being written to DRAM (Dynamic Random Access Memory) to save about 200 kb of DRAM space" and that "2. Decoded B frames are compressed with a lossy DPCM compression technique to save DRAM space".

That is, in MPEG-1, only B frames (Bidirectional Predicted Frames) are compressed using the lossy DPCM (Differential Pulse Code Modulation) technique to save about 200 kb of memory capacity.

The term "MPEG" means an organization for advancing the standardization of a coding system for storing color moving pictures, and also means the name of a coding system, for which the standardization work has been done by the MPEG. MPEG coding systems are classified into three types of MPEG-1, MPEG-2 and MPEG-4 to advance the standardization thereof (MPEG-3 for tens Mbit/second of high definition images was absorbed into the MPEG-2). The MPEG-2 is a high efficiency coding technique for internationally standardized multimedia data, which is intended to be applied to current broadcasts, high definition televisions (HDTVs) and AV equipments, and has an image transfer rate of 4 Mbit/second to 60 Mbit/second (4 Mbit/second to 10 Mbit/second before absorbing the MPEG-3). Therefore, the MPEG-2 is a motive power for the spread of digital multimedia for home and for software making. Similar to the MPEG-1, the images managed by the MPEG-2 include three types of pictures, i.e., B pictures (Bidirectional predictive frame pictures), P pictures (Predictive frame pictures) and I pictures (Intra-frame pictures).

FIG. 1 shows the frame arrangements when the respective frames of the B, P and I pictures are compressed to be reproduced. In the upper arrangement of frames for a current image, the upper alphabet denotes the kind of the image, and the lower numeral denotes the order of the arrangement of frames. In the middle arrangement of frames for a compressed image, an I picture capable of being produced only by its frame is preferentially arranged, and the arrangement of frames is recombined in the order of B, B and P pictures after the I picture. In the lower arrangement of frames for a reproduced image, an image having the same arrangement of frames as that of the current image is reproduced using a prediction according to the kind of the image of the frame.

For example, when an I2 frame is reproduced, it can be reproduced by itself, and when a P5 frame is reproduced, its picture is reproduced using the preceding I2 frame picture. When a B6 frame is reproduced, it is reproduced using the P5 frame picture and a P8 frame picture in a compressed image since it uses the last and next P picture frames in the current image.

Referring to the block diagram of FIG. 2, the conventional image decompression system, which operates by such a principle, will be described. In FIG. 2, an image decompression system 100 comprises: a decoding part 101 for decompressing an inputted compressed image to output a decoded image; a reference image storing part 102 for storing, as a reference image, the decompressed decoded image outputted from the decoding part 101; an adder 103 for adding the decoded image outputted from the decoding part 101, to the reference image stored in the reference image storing part 102 to output a synthesized decoded image; and a switch 104 for selecting one of the outputs of the decoding part 101 and the adder 103.

The conventional image decompression system 100 shown in FIG. 2 decompresses a compressed image using the respective frame pictures of the above described I, P and B pictures to output a decompressed image. Specifically, when the I frame of the compressed image is decompressed, the decompressed I picture is directly displayed and outputted, and the reference image storing part 102 stores the I picture frame using a region for a single picture. When the P picture frame is inputted as a compressed image, the reference image of the I picture frame is outputted, and the P picture is decompressed using the I picture by means of the adder 103.

When the inputted compressed image to be decoded is a B picture, the decompression is carried out using two pictures, i.e., the last and next pictures of I pictures or P pictures in the current image. Therefore, for example, in the case of the B6, the pictures of two frames, i.e., P5 and P8 frames, are stored in the reference image storing part 102. Thus, in the conventional image decompression system, the reference image storing part 102 must have a memory capacity capable of storing at least two frames of the decompressed and expanded decoded image.

However, in the conventional image decompression system described above, first, since the image has two kinds of pictures respectively having high and low compression rates, there is a problem in that a certain memory capacity can not be assured.

Second, since a method called "the lossy DPCM" is used, if the same of a certain capacity is attempted, the dispersion in picture quality occurs by the degree of deterioration of the picture quality due to some properties of the image, so that there is a problem in that the whole picture quality of the reproduced image is deteriorated.

Third, the saved memory capacity is 200 kb at the most, so that there is a problem in that the reduction of the memory capacity is insufficient. Since commercially available DRAMs have discrete values, e.g., 1 Mbit, 4 Mbit and 16 Mbit, only a part of the memory region of a single DRAM is saved, so that it does not contribute to the reduction of the number of DRAMs at all.

SUMMARY OF THE INVENTION

It is therefore an object of the present invention to eliminate the aforementioned problems and to provide an image decompression system, which can increase a memory capacity capable of being saved by the compression of data, and which can prevent the deterioration of a picture quality, to save the memory capacity and improve the picture quality of a reproduced image.

In order to accomplish the aforementioned and other objects, according to the present invention, there is provided an image decompression system, which can improve the memory capacity to be saved and prevent the deterioration of the picture quality by compressing and decompressing decoded image data using the same system as a compressing system used for the compression of image data.

Specifically, according to an aspect of the present invention, there is provided an image decompression system comprising: decoding means including at least one decoding part for decoding an inputted compressed image by the same system as a coding system of the compressed image; coding means for coding a decoded image, which has been decoded by the decoding means, to reproduce a compressed image; and output means for selectively outputting one of the decoded image outputted from the decoding means and a decoded image derived by decoding a compressed reference image compressed by the coding means.

The image decompression system may further comprise compressed reference image storing means for storing the compressed reference image compressed by the coding means, and the output means may include: an adder for adding the decoded image outputted from the decoding means, to the decoded image, which has been obtained by decoding the compressed reference image stored in the compressed reference image storing means; and a first switch for selecting one of the decoded image outputted from the decoding means and the decoded image outputted from the adder.

The decoding means may comprise; a first decoding part for decoding the inputted compressed image; and a second decoding part for decoding the compressed image, which has been obtained by compression-coding, using the coding means, a decoded image decompressed by the first decoding part and which is stored in the compressed reference image storing means as a reference image for prediction.

The compressed reference image storing means may have a second switch for receiving a compressed image coded by the coding means and an inputted compressed image and for selecting one of two inputs of the compressed reference image storing means.

The image decompression system may further comprise: display image storing part for storing a compression image corresponding to a display image coded by the coding means; and a third switch for selectively supplying one of the inputted compressed image and a compressed display image stored in the display image storing part, to the first decoding means and the second switch.

In the image decompression system, at least the decoding means, the coding means and the output means may be integrated to form an LSI decompression part of a large scale integrated circuit. Alternatively, the decoding means, the coding means, the output means and the compressed reference image storing means may be integrated to form an LSI decompression part.

In the image decompression system, the decoding means may comprise: a decoding part for receiving and decoding one of the inputted image and the compressed image, which is stored in the compressed reference image storing part and which has been coded by the coding means; and a decoded reference image storing part for storing a decoded reference image decoded by the decoding means, and the image decompression system may further comprise a second switch for selectively allowing one of the compressed reference image coded by the coding means and the inputted compressed image to be inputted to the compressed reference image storing part, and a third switch for selectively allowing one of the output of the compressed reference image storing part and the inputted compressed image to be inputted to the decoding part.

The compressed reference image storing part may comprise a compressed reference display image storing part having a region for storing a decoded image outputted via the first switch and a compressed display image obtained by coding from a display image by the coding means.

In this image decompression system, at least the decoding part, the coding means, the output means and the second and third switches may be integrated to form an LSI decompression part of a large scale integrated circuit (LSI).

The compressed reference image storing part and/or the compressed reference display image storing part may be integrated to be contained in the LSI decompression part.

In the image decompression system, a coding system of the coding means may be an intra-frame or intra-field coding system.

The decoding means may decode an input compressed image and an output of a compressed reference image storing part.

As described in detail above, in an image decompression system of the present invention, in the case of an image capable of being decoded in its frame (this image corresponds to an I picture in the MPEG), an inputted compressed image is directly stored in a reference image storing part without being decoded, by the change-over of a second switch, so that it is possible to prevent the image to be deteriorated by repeating the decoding and coding. In addition, since the coding system of a coding part is the same as the system in the case of the image capable of being decoded in its frame (this image corresponds to an I picture in the MPEG), even in the case of a reference image, which needs image information of the past and future frames (this reference image corresponds to a P picture in the MPEG), a decoding part for a reference image capable of being decoded in its frame (this reference image corresponds to an I picture in the MPEG) can be commonly used, so that the total amount of hardware can be reduced.

DETAILED DESCRIPTION OF THE PREFERRED EMBODIMENTS

Referring now to the accompanying drawings, the preferred embodiments of an image decompression system, according to the present invention, will be described in detail below.

Figure 3:
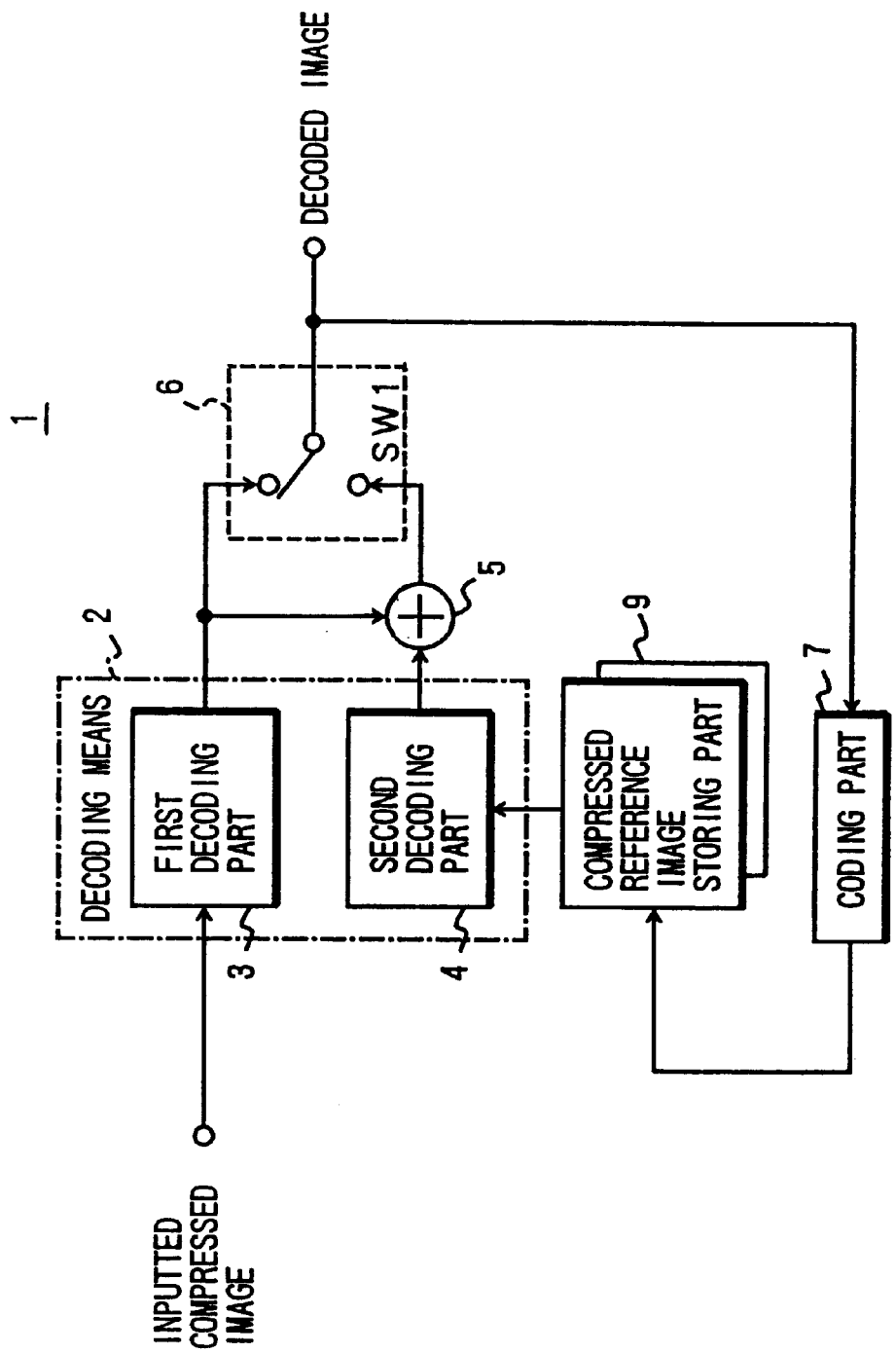
FIG. 3 is a block diagram of the first preferred embodiment of an image decompression system according to the present invention.

First, referring to FIG. 3, the first preferred embodiment of an image decompression system, according to the present invention, will be described. The first embodiment has the fundamental constitution of the present invention. In FIG. 3, an image decompression system 1 comprises: decoding means 2 comprising a first decoding part 3 for decoding an inputted compressed image and a second decoding part 4 for decoding a compressed reference image; an adder 5 for adding a decoded image outputted from the second decoding part 4, to a decoded image outputted from the first decoding part 3; a first switch 6 for selecting one of the outputs of the first decoding part 3 and the adder 5; a coding part 7 for receiving the same signal as the decoded image outputted via the first switch 6 to encode the signal again; and a compressed reference image storing part 9 for storing, as a reference image, the compressed image supplied from the coding part 7.

Next, there will be described an image decompression system according to the second embodiment of the present invention. The decompression system according to the second embodiment further comprises a second switch 8 for selecting one of the compressed image of the coding part 7 and the inputted compressed image to supply the selected compressed image, in addition to the components described in the first embodiment. Further, the compressed image is supplied from the coding part 7 through the change-over of the second switch 8. Also, the inputted compressed image is supplied to the compressed reference image storing part 9 through the change-over of the second switch 8.

Figure 4:
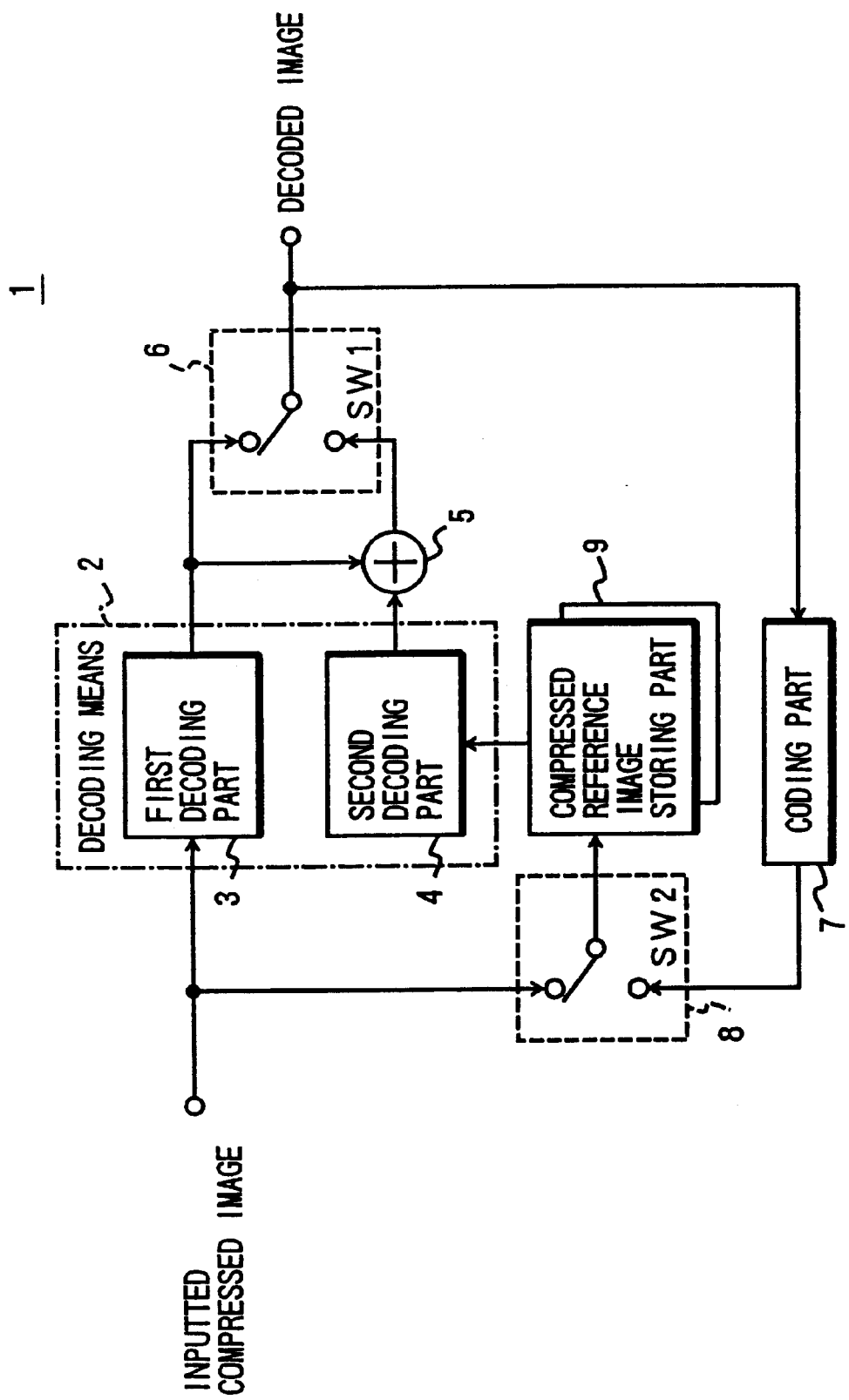
FIG. 4 is a block diagram of the second preferred embodiment of an image decompression system according to the present invention.

In FIG. 4, the coding part 7 is designed to encode by a coding system corresponding to the decoding system of the second decoding part 4. As a preferred system, the coding system of the inputted compressed image may be the same as the coding system of the coding part 7. More preferably, this coding system corresponds to the decoding systems of the first and second decoding parts 3 and 4. Specifically, the coding and decoding systems include the discrete cosine transform (DCT), which is one of intra-frame/field coding systems in the MPEG, or the combination of the DCT and the Huffman coding. Furthermore, the inverse DCT, the combination of the inverse DCT and the Huffman decoding and so forth correspond to this coding system.

Examples of other coding/decoding systems include the combination of the fractal transform and the fractal inverse transform, the combination of the vector quantization and the vector inverse quantization, the combination of the DCT and the vector quantization, and the combination of the inverse DCT and the vector inverse quantization. According to the present invention, the decoding systems in the first and second decoding parts 3 and 4 correspond to the coding system for the inputted compressed image, and the coding system in the coding part 7 corresponds to the decoding system in the second decoding part 4 so as to be the same as the coding system for the inputted compressed image.

The operation of the second preferred embodiment of the image decompression system shown in FIG. 4 will be described below.

First, in a case where the inputted compressed image is an image capable of being decoded in its frame without the need of image information about the past and future frames (this image corresponds to an I picture in the MPEG), the compressed image is decoded by means of the first decoding part 3 to be directly outputted as a decoded image. In addition, in a case where the inputted compressed image is utilized as a reference image of another frame, the compressed image inputted via the second switch (SW2) 8 is stored in the compressed reference image storing part 9 as a reference image.

Then, in a case where the inputted compressed image requires the image information about the past and future frames (this image corresponds to a P picture and a B picture in the MPEG), a sum of a motion vector decoded by the first decoding part 3 and a reference image, which is read out of the compressed reference image storing part 9 to be decoded by the second decoding part 4, is derived by means of the adder 5 to be outputted via the first switch (SW1) 6 as a decoded image. In a case where this decoded image will be used for prediction in future (this image corresponds to a P picture in the MPEG), the decoded image is compressed again by means of the coding part 7 to be stored in the compressed reference image storing part 9 via the second switch (SW2) 8. In a case where this decoded image will not be used for predication in future (this image corresponds to a B picture in the MPEG), the decoded image is not compressed by the coding part7 and not stored in the compressed reference image storing part 9.

Figure 5:
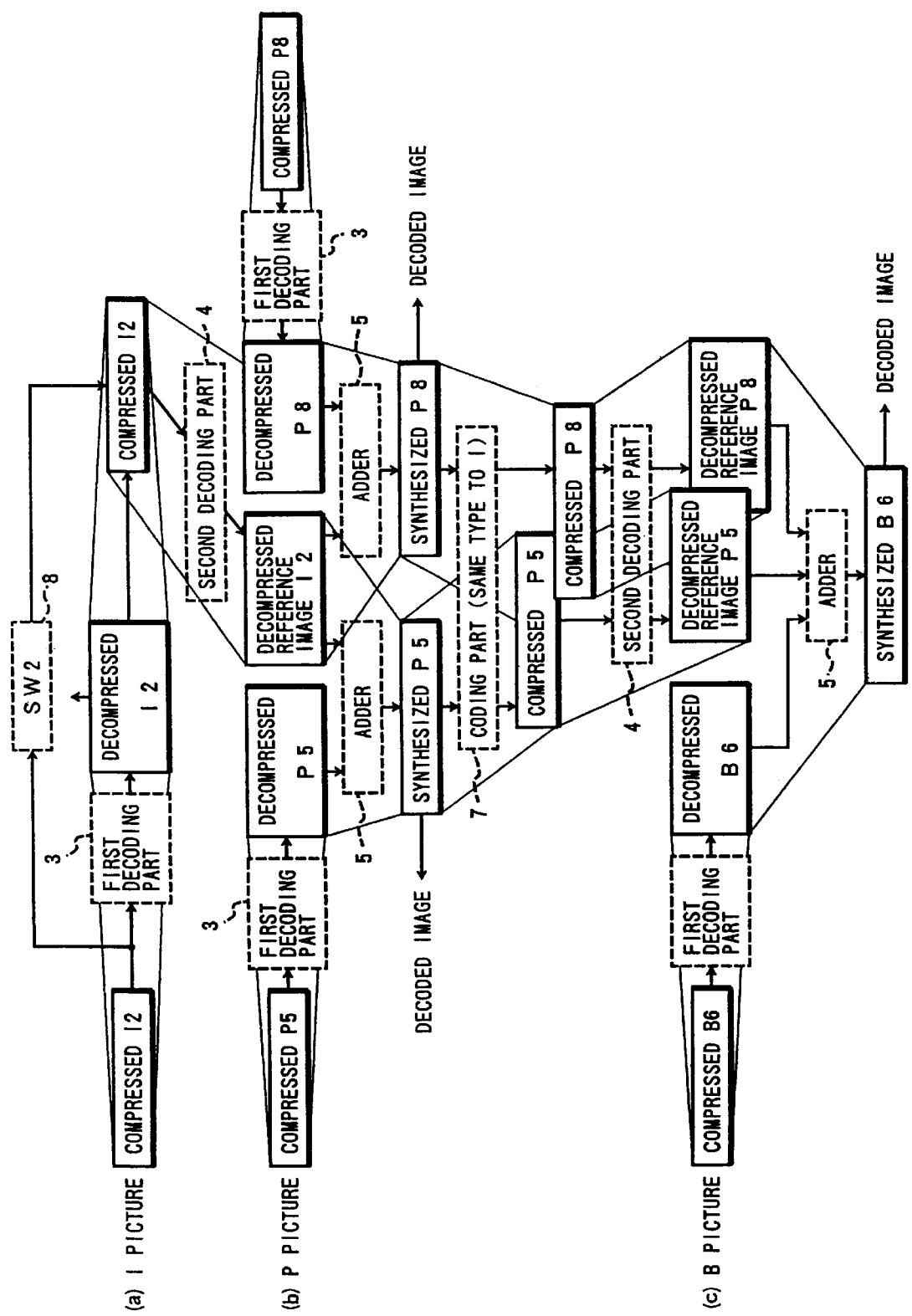
FIG. 5 is a schematic diagram for explaining the operation of the second preferred embodiment of an image decompression system according to the present invention.

Referring to FIG. 5, the explanation of the operation of the second preferred embodiment of an image decompression system, according to the present invention, will be supplemented. In the following example, the respective pictures of the I2 frame, the P5 and P8 frames and the B6 frame are decompressed to be outputted as decoded images, respectively, and utilized as reference images when P and B pictures are decoded. In a case where the inputted compressed image is an I picture, since the I picture can be decoded in its frame, the first decoding part 3 decodes the compressed image without the need of another decompressed image to produce a decompressed I picture as shown in FIG. 5(*a*). In addition, the inputted compressed image is directly stored in the storing part 9 as a compressed reference image.

Then, in a case where the inputted compressed image is a P picture, the compressed image is decompressed by means of the first decoding part 3 using the decompressed I or P picture as shown in FIG. 5(b). This decompressed P picture is coded by the same coding system as that of the I picture to be stored in the storing part 9 as a compressed reference image. In the case of a B picture, it is decompressed in the first decoding part 3 using the decompressed I or P picture to be a decompressed B picture as shown in FIG. 5(c). In a case where a B picture to be decompressed is a B6 frame, the compressed images of the P5 and P8 frames are used as reference images. Thus, the coding system of the coding part 7 is always the same as the coding system for the I picture, i.e., the intra-frame coding, regardless of the kind of the inputted compressed image.

With the construction described above, since the image decompression system in the second preferred embodiment also stores the reference image in the compressed form, the memory capacity can be greatly reduced. In addition, since the compressing system of the reference image is a system capable of being decoded in its frame, it is not required to provide any additional reference images used for decoding the reference images, so that the memory capacity can be reduced.

In addition, in the case of an image capable of being decoded in its frame (this image corresponds to an I picture in the MPEG), the inputted compressed image can be directly stored in the reference image storing part without the need of decoding and decompression, so that it is possible to prevent the deterioration of picture quality due to the repeated decoding and coding. Moreover, since the coding system in the coding part 7 is the same system as that for an images capable of being decoded in its frame (this image corresponds to an I picture in the MPEG), even in a case where a reference image capable of being decoded in its frame (this image corresponds to an I picture in the MPEG) is decoded, the second decoding part 4 used when decoding a reference image which requires image information about the past and future frames (this image corresponds to a P picture in the MPEG) can be commonly used, so that the quantity of hardware can be reduced.

In the second preferred embodiment, the advantages of the image decompression system include the reduction of the memory capacity due to the compression of the reference images, the prevention of deterioration of the picture quality in the intra-frame decoded image, and the reduction of the quantity of hardware due to the adoption of the same coding system. Therefore, according to this second preferred embodiment, there are particularly advantageous effects in that it is possible to reduce the memory capacity and the circuit scale of the whole system.

Figure 6:
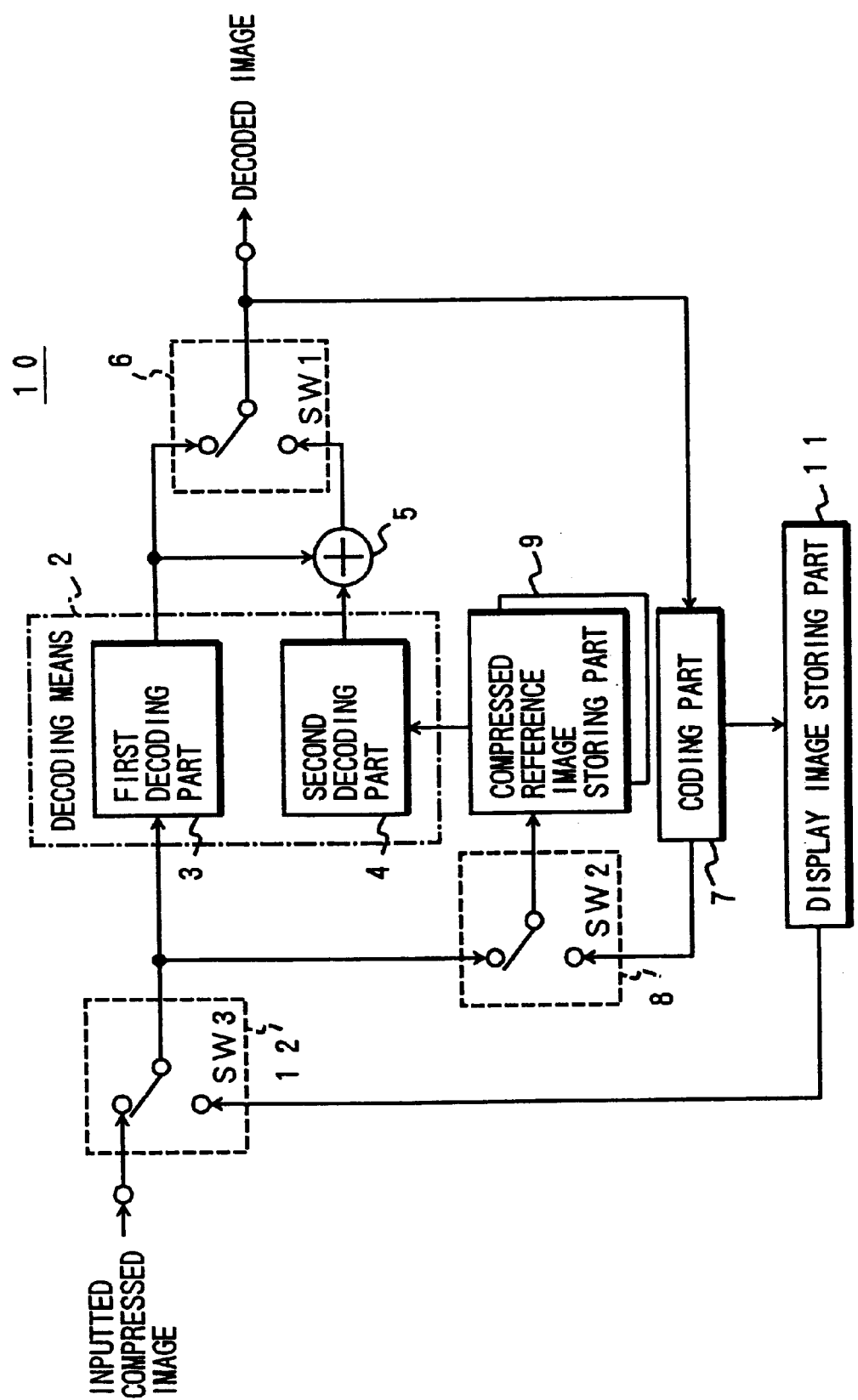
FIG. 6 is a block diagram of the third preferred embodiment of an image decompression system according to the present invention.

Referring to FIG. 6, the third preferred embodiment of an image decompression system, according to the present invention, will be described in detail below.

In the third preferred embodiment shown in FIG. 6, an image decompression system 10 includes, in addition to the construction of the second preferred embodiment of the decompression system, a display image storing part 11 for storing a compressed display image outputted from a coding part 7, and a third switch (SW3) 12 for selecting one of the compressed display image and the inputted compressed image.

In this third preferred embodiment, as shown in FIG. 6, there are provided the display image storing part 11 for storing the output of the coding part 7 and the third switch (SW3) 12 for selecting one of the output of the display image storing part 11 and the inputted compressed image, in addition to the construction of FIG. 4. Therefore, in a case where the display image is compressed by means of the coding part 7 to be buffered in the display image storing part 11 to be displayed, if the third switch (SW3) 12 selects the output of the display image storing part, it is possible to decompress and decode the display image via the first decoding part 3.

In the third preferred embodiment, the image decompression system is characterized in that a compressed reference image storing part 9 and the display image storing part 11, as shown in FIG. 6, are substituted for the compressed reference image storing part of FIG. 4. In the compressed reference image storing part 9 and the display image storing part 11, the storing part for compressed images is used for both the reference image and the display image. Therefore, in addition to the advantages of the first preferred embodiment, the image data stored in the display image storing part can be compression-coded to reduce the memory capacity.

In addition to the advantages described in the second preferred embodiment shown in FIG. 4, the third preferred embodiment of the image decompression system has an advantage in that the memory capacity may be small since the image data stored in the display image storing part 11 are compression-coded.

Figure 7:
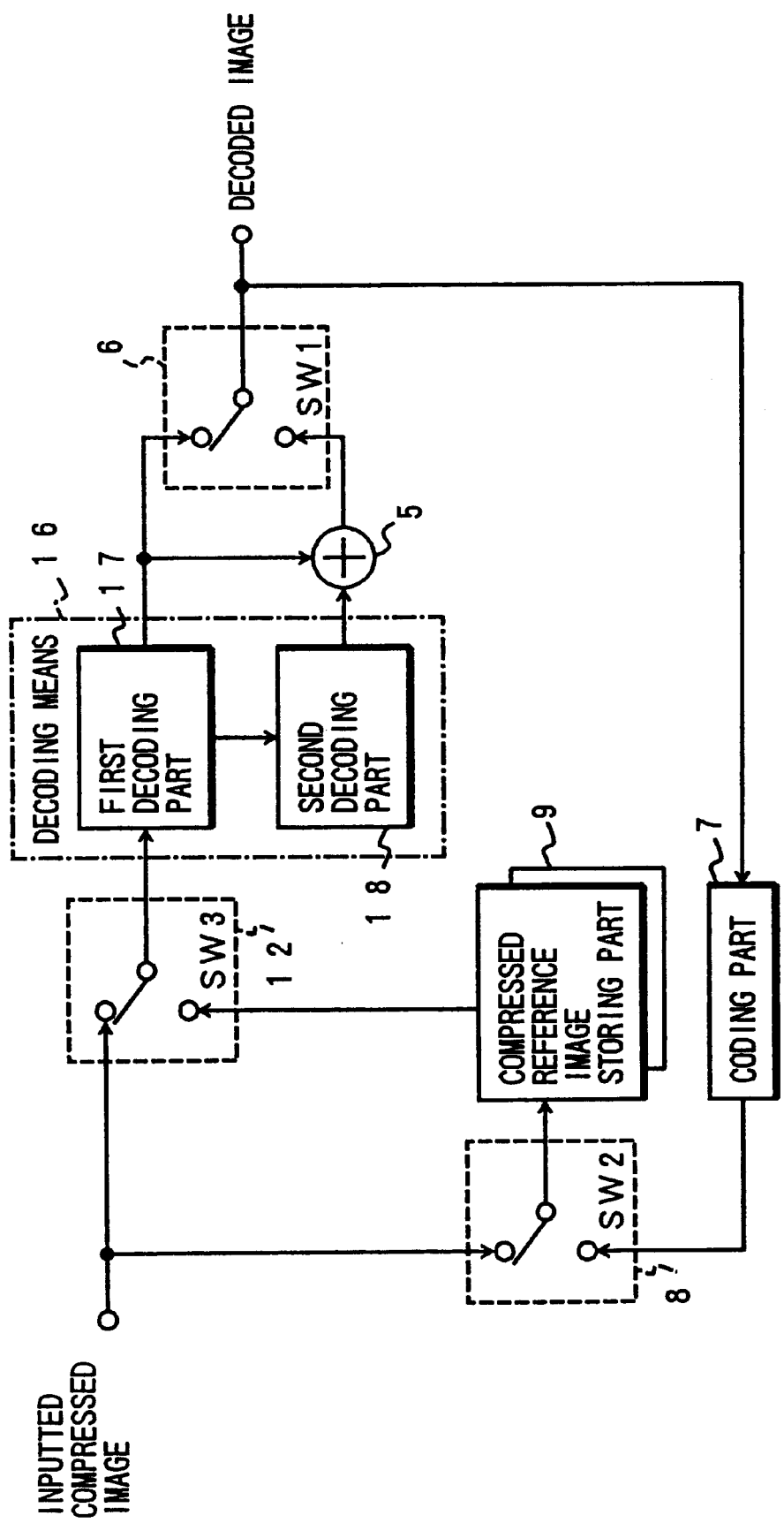
FIG. 7 is a block diagram of the fourth preferred embodiment of an image decompression system according to the present invention.

Referring to FIG. 7, the fourth preferred embodiment of an image decompression system, according to the present invention, will be described in detail below.

In this fourth preferred embodiment, decoding means 16 is provided in place of the decoding means 2 in the first through third preferred embodiments. As shown in FIG. 7, the decoding means 16 comprises a decoding part 17 for decompressing a compressed image, and a decoded reference image storing part 18 for storing, as a reference image, a decoded image decoded by the decoding part 17. Therefore, the decoded image synthesized by the adder 5 is the sum of the outputs of the decoding part 17 and the decoded reference image storing part 18.

As described above, in the fourth preferred embodiment of the image decompression system, since the decoding means 16 has only one decoding part 17, it is required to provide, in front of the coding part 17, a third switch (SW3) 12 for selecting one of the inputted compressed image and the compressed reference image stored in the compressed reference image storing part. In addition, similar to the second preferred embodiment shown in FIG. 5, the amount of image stored in the reference image storing part 18 does not need to be equal to that of the whole image of a single frame, and may be equal to that of the search range of motion vectors when being coded.

In the fourth preferred embodiment, the coding system of the coding part 7 corresponds to the system of the decoding part 17. Examples of the decoding systems of the decoding part include the DCT (Discrete Cosine Transformation), which is an intra-frame/field coding in the MPEG, and the combination of the DCT and the Huffman coding.

The operation of the fourth preferred embodiment of the image decompression system shown in FIG. 7 will be described below. In this preferred embodiment, a single coding part 17 has both functions of the first and second decoding parts 3 and 4 in the first through third preferred embodiments of the image decompression systems shown in FIGS. 3, 4 and 6.

In a case where the inputted compressed image is an image capable of being decoded in its frame without the need of image information about the past and future frames (this image corresponds to an I picture in the MPEG), the operation is the same as that of the preferred embodiments shown in FIGS. 3, 4 and 6. In a case where the inputted compressed image is an image, which needs image information about the past and future frames (this image corresponds to P and B pictures in the MPEG), the inputted compressed image is switched by the third switch 12 to be decoded by the decoding part 17 to be added to the reference image stored in the decoded reference image storing part 18 by the adder 5 (this does not need to be a single image in this preferred embodiment), to be outputted via the first switch 6 as a decoded image.

In a case where this decoded image is an image, which will be used for prediction in future (this image corresponds to a P picture in the MPEG), the image is compressed by the coding part 7 again to be stored in the compressed reference image storing part 9 via the second switch (SW2) 8. In a case where this decoded image is an image, which will not used for prediction in future (this image corresponds to a B picture in the MPEG), the image is not compressed by the coding part 7 and not stored in the image storing part 9. In a case where this image is an image capable of being decoded in its frame (this image corresponds to an I picture in the MPEG), the input image is directly stored in the compressed reference image storing part 9 via the second switch (SW2) 8.

Figure 8:
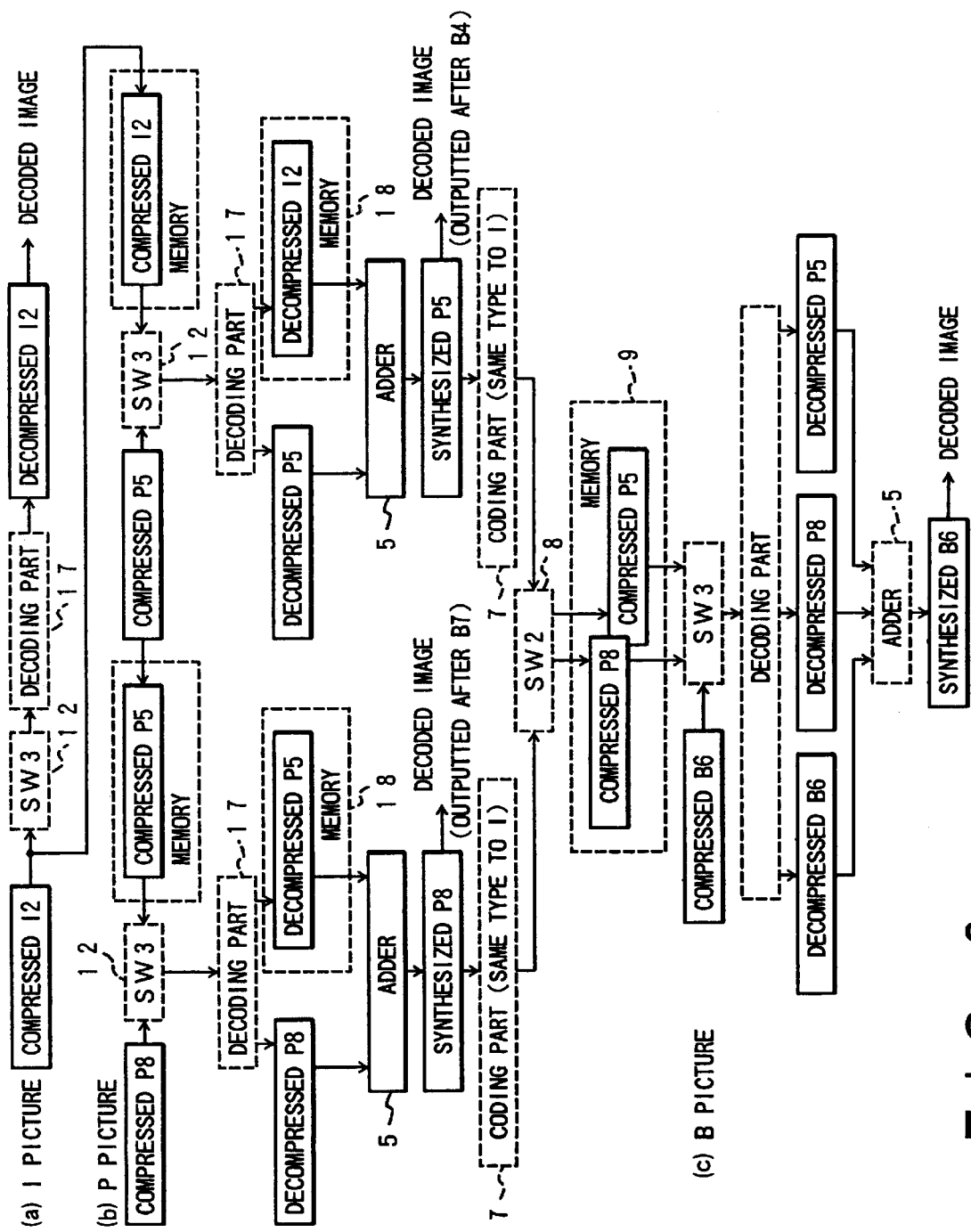
FIG. 8 is a schematic diagram for explaining the operation of the fourth preferred embodiment of an image decompression system according to the present invention.

Referring to FIG. 8, the explanation of the operation of the fourth preferred embodiment of an image decompression system, according to the present invention, will be supplemented. In a case where the inputted image is an I picture, e.g., the I frame picture shown in FIG. 1, the image is inputted to the decoding part 17 via the third switch 12 shown in FIG. 7, to be decoded therein to be a decompressed I2 picture. This I2 picture is outputted as a decoded image and coded by the coding part 7 to be stored in the memory 9 as a compressed I2 picture.

Figure 1:
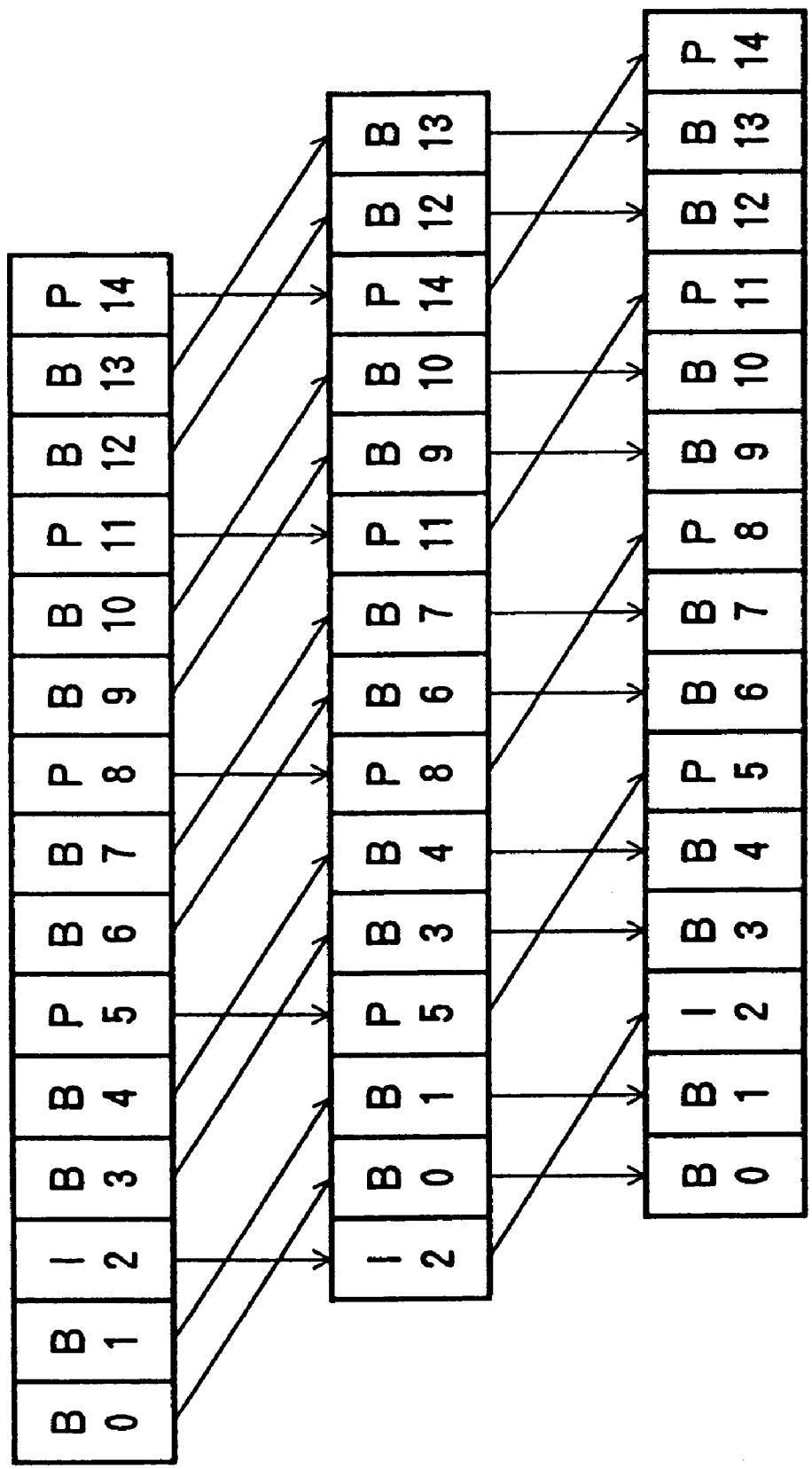
FIG. 1 is a schematic diagram for explaining the principle of compression and decompression of image data.
Figure 2:
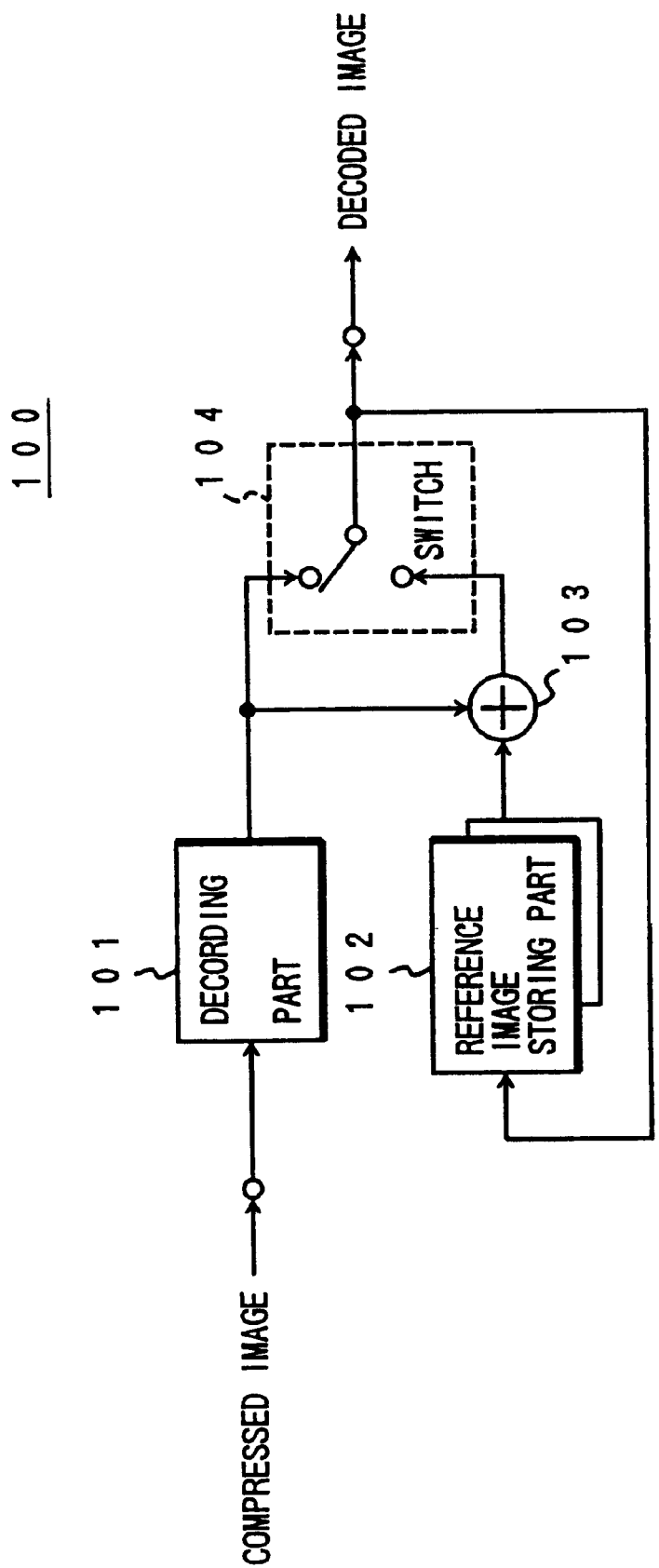
FIG. 2 is a block diagram of a conventional image decompression system.

Then, in a case where the inputted compressed image is a P picture, e.g., the P5 frame picture shown in FIG. 1, the P5 picture compressed in the decoding part 17 by the change-over of the third switch 12, and the decompressed I2 picture are decoded to be a decompressed P5 picture and a compressed I2 picture, respectively, as shown in FIG. 8(b). The decompressed I2 picture is stored in the memory 18 as a reference image to be synthesized by the adder 5 to be outputted as a synthesized P5 picture. The synthesized P5 picture is outputted as a decoded image and also supplied to the coding part 7 to be compressed again by the same system as that for the I picture to be stored, via the second switch 8, in the memory 9 as a compressed P5 picture.

Then, in a case where the inputted compressed image is a B picture, e.g., the B6 frame picture shown in FIG. 1, the image is decoded using the P pictures before and after the B6 frame in the current image, i.e., the P5 and P8 pictures as shown in FIG. 8(c). Since the P8 picture compressed via the second switch 8 is also stored in the memory 9, the P5 and P8 pictures compressed via the third switch 12 are supplied to the decoding part 17 to be decoded therein to be stored in the memory 18 as decompressed P5 and P8 pictures. Then, the third switch 12 is changed over, so that the compressed B6 picture is supplied to the decoding part 17 to be decoded therein to output a decompressed B6 picture. These decompressed B6, P5 and P8 picture are synthesized by the adder 5 to output a synthesized B6 picture as a decoded image.

Since the fourth preferred embodiment of the image decompression system includes, in addition to the construction of the second preferred embodiment of the image decompression system, the decoding means 16 comprising the decoding part 17 and the decoded reference image storing part 18, it is possible to provide a single integrated decoding part to reduce the circuit scale.

Figure 9:
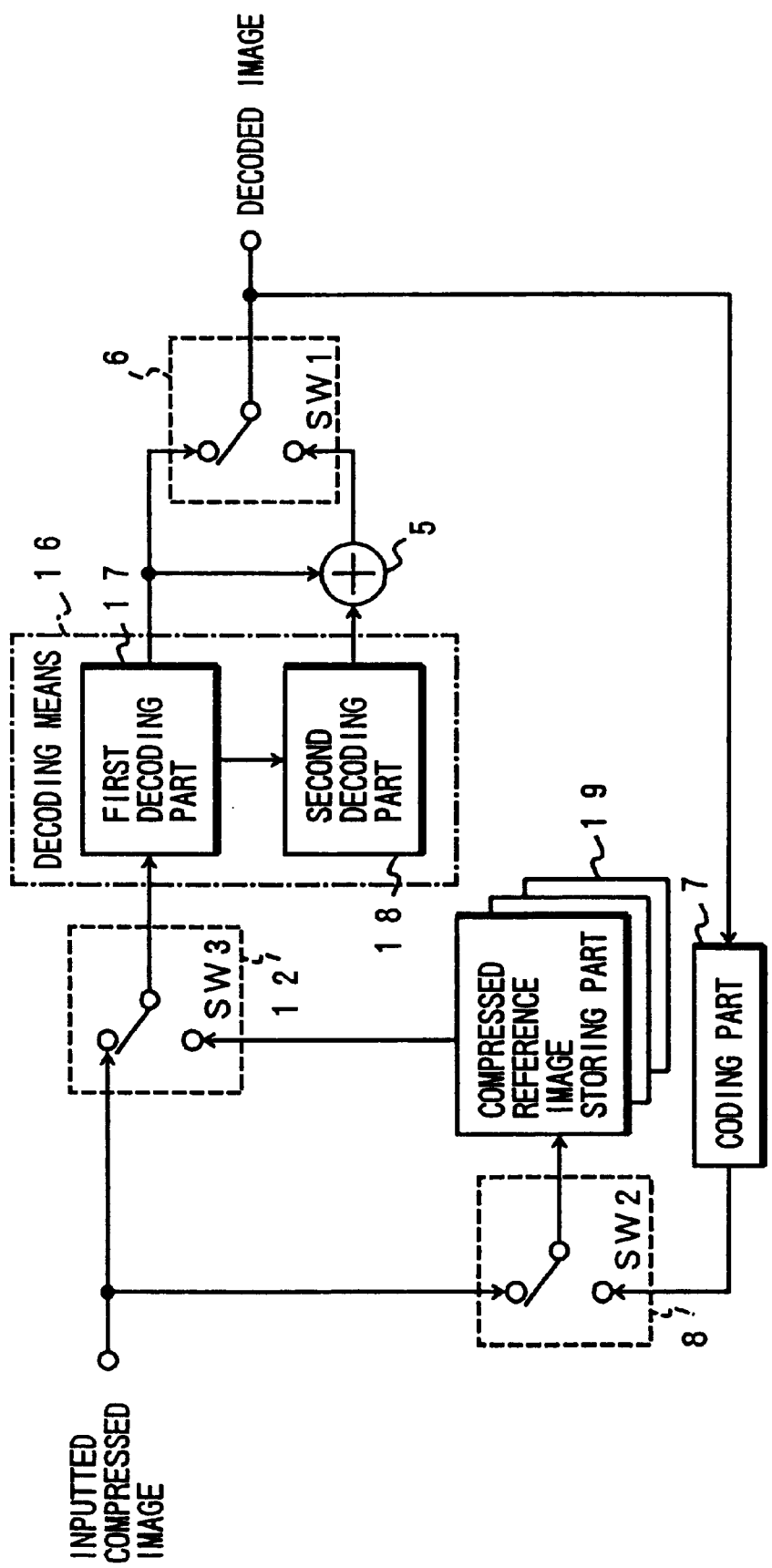
FIG. 9 is a block diagram of the fifth preferred embodiment of an image decompression system according to the present invention.

Referring to FIG. 9, the fifth preferred embodiment of an image decompression system, according to the present invention, will be described below.

In this fifth preferred embodiment, an image decompression system 20 is characterized by a compressed reference display image storing part 19 substituted for the compressed reference display image storing part 9 in the third preferred embodiment of the image decompression system shown in FIG. 7. This compressed reference image storing part 19 is the same construction as that of the integration of the compressed reference image storing part 9 and the display image storing part 11 shown in FIG. 6. Since it is not required to provide the two storing parts 9 and 11 of the second preferred embodiment of the image decompression system in order to store the display image, the circuit scale, particularly the memory scale, can be further reduced.

In the first through fifth preferred embodiment of the image decompression systems described above, it has not been described whether the respective elements are formed in a discrete or integrated circuit structure. Although both circuit structures may be used, the elements other than of the memory of the image decompression system, according to the present invention, may be formed in a single chip of large scale integrated circuit. Referring to FIGS. 10 through 13, the sixth through ninth preferred embodiments of an image decompression system, according to the present invention, which correspond to the first through fifth preferred embodiment, will be described in detail below.

Figure 10:
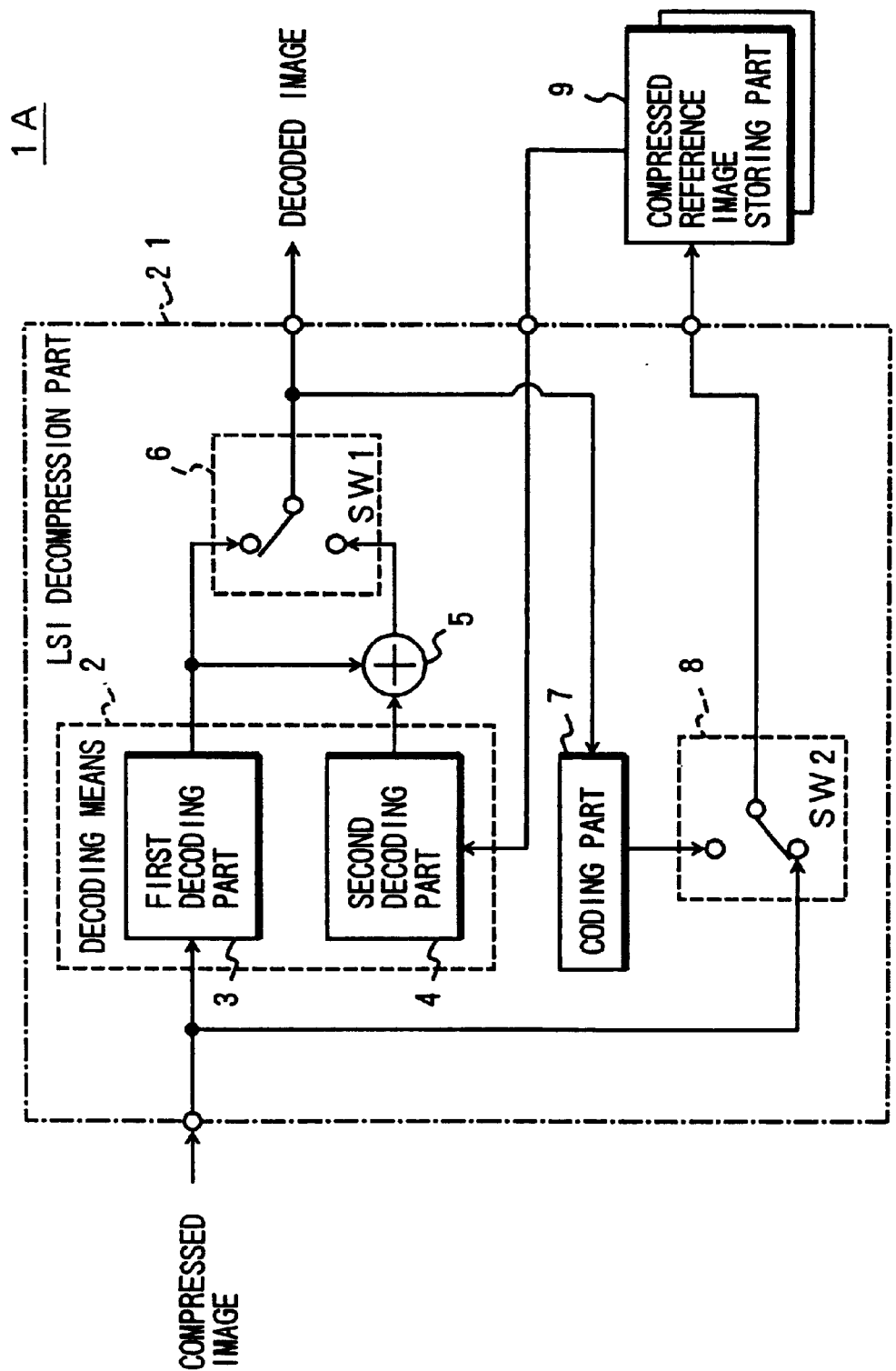
FIG. 10 is a block diagram of the sixth preferred embodiment of an image decompression system according to the present invention.

FIG. 10 is a block diagram of the sixth preferred embodiment of an image decompression system according to the present invention. In FIG. 10, an image decompression system 1A comprises an LSI (Large Scale Integrated Circuit) decompression part 21, and a compressed reference image storing part 9 for storing a compressed reference image, which has been compressed again in decoding means 2 in the LSI decompression part 21.

The LSI decompression part 21 comprises: a first decoding part 3 for decoding a compressed image inputted via an input terminal; a second decoding part 4 for decoding a compressed reference image stored in the compressed reference image storing part 9; an adder 5 for synthesizing an image by means of the sum of the outputs of the first decoding part 3 and the second decoding part 4; a first switch (SW1) 6 for selecting the output images of the first decoding part 3 and the adder 5; a coding part 7 for compression-coding a decoded image, which is selected by the first switch 6, again; and a second switch (SW2) 8 for selecting the output of the coding part 7 or the inputted compressed image, which is outputted to the compressed reference image storing part 9.

In this sixth preferred embodiment, since the elements other than the memory are formed in a single chip of LSI, the circuit scale can be greatly reduced, and the whole image decompression system can be integrated.

Figure 11:
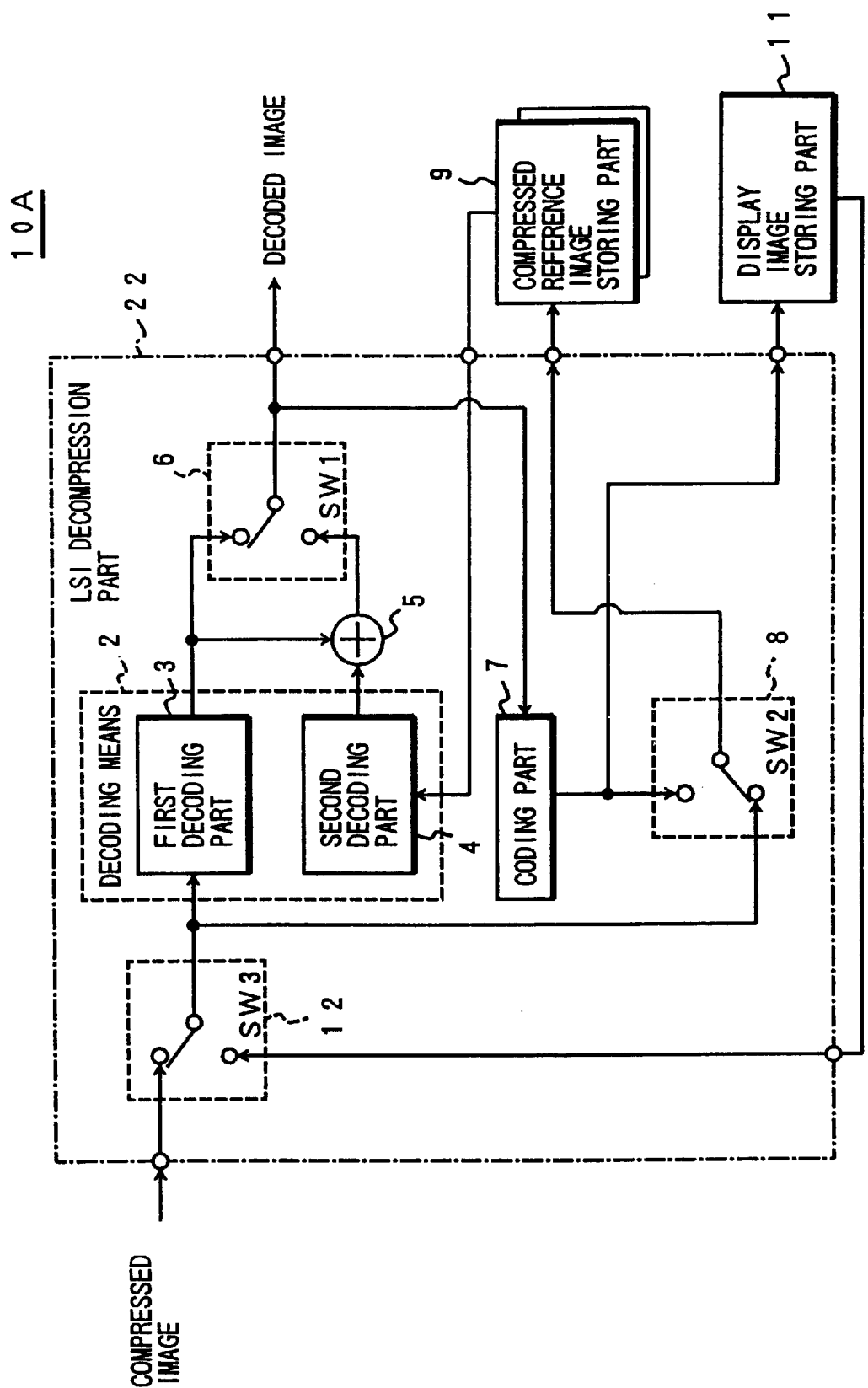
FIG. 11 is a block diagram of the seventh preferred embodiment of an image decompression system according to the present invention.

Referring to FIG. 11, the seventh preferred embodiment of an image decompression system, according to the present invention, will be described below.

This seventh preferred embodiment of the image decompression system corresponds to the third preferred embodiment of the image decompression system, and the basic elements thereof are the same as those in FIG. 6. In FIG. 11, an image decompression system 10A comprises an LSI decompression part 22, and a memory including a compressed reference image storing part 9 and a display image storing part 11. This memory may comprise separate memories for the compressed reference image storing part 9 and the display image storing part 11, or a common memory having different addresses for stored data.

The LSI decompression part 22 comprises decoding means 2 including a first decoding part 3 and a second decoding part 4, an adder 5, a first switch (SW1) 6, a coding part 7, a second switch (SW2) 8 and a third switch (SW3) 12. These elements are formed in a single chip of LSI. The functions and advantages of the LSI decompression part 22 are the same as those of the third preferred embodiment of the image decompression system shown in FIG. 6.

The compressed reference image storing part 9 stores any one of an inputted compressed image and a compressed display image, which are selected by the third switch 12, and an image compressed by a coding part 7 to be selected by the second switch 8. On the other hand, the display image storing part 11 stores a compressed image coded by the coding part 7.

Figure 12:
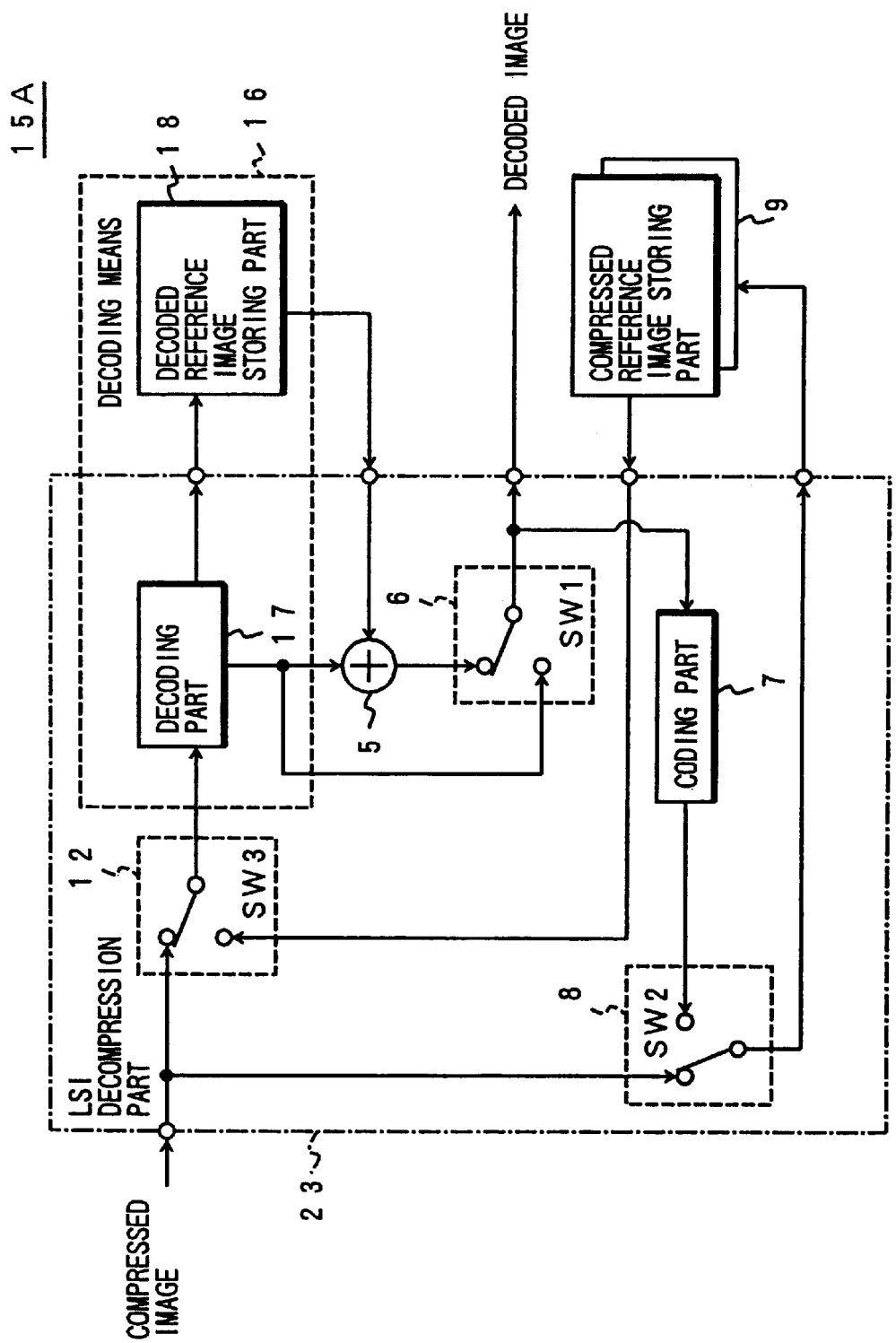
FIG. 12 is a block diagram of the eighth preferred embodiment of an image decompression system according to the present invention.

Referring to FIG. 12, the eighth preferred embodiment of an image decompression system, according to the present invention, will be described below.

This eighth preferred embodiment of the image decompression system corresponds to the fourth preferred embodiment of the image decompression system shown in FIG. 7, and the same elements other than the memory as those of FIG. 7 are integrated into an LSI. In FIG. 12, an image decompression system 15A comprises an LSI decompression part 23, and a memory including a compressed reference image storing part 9 and a decoded reference image storing part 19.

In FIG. 12, the LSI decompression part 23 comprises: a third switch (SW3) 12 for selecting one of an inputted compressed image and a compressed reference image supplied from the compressed reference image storing part 9; a decoding part 17 for decoding any one of the compressed images supplied via the third switch 12; an adder 5 for deriving a sum of a decoded image and a decoded reference image stored in the decoded reference image storing part; a first switch (SW1) 6 for selecting one of the outputs of the decoding part 17 and the adder 5; a coding part 7 for encoding the decoded image being the output of the first switch 6; and a second switch (SW2) 8 for selecting one of the compressed image outputted from the coding part 7 and the inputted compressed image to supply any one of the compressed images to the compressed reference image storing part 9.

The compressed reference image storing part 9 stores, as a reference image, any one of the compressed images, which has been selected by the second switch 8 to be supplied thereto. The decoded reference image storing part 18 is a memory for storing an image decoded by the decoding part 17 in order to output the image to the adder 5. Furthermore, as described in the fourth preferred embodiment, decoding means 16 is formed by the decoding part 17 and the decoded reference image storing part 18. Therefore, in this eighth preferred embodiment, the decoding means 16, which has been considered to be a single element in the fourth preferred embodiment, is divided into the inside and outside of the LSI.

Figure 13:
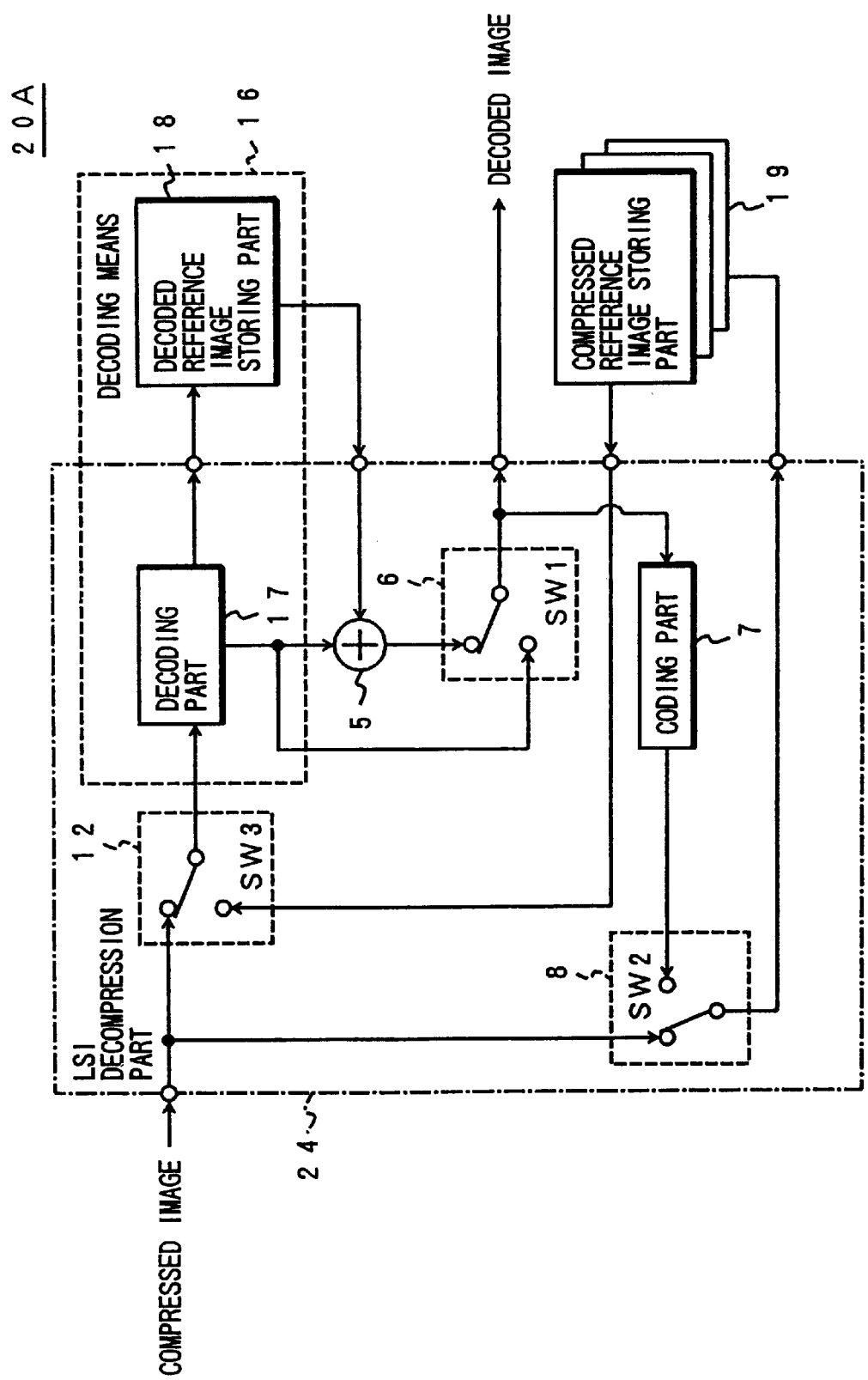
FIG. 13 is a block diagram of the ninth preferred embodiment of an image decompression system according to the present invention.

Referring to FIG. 13, the ninth preferred embodiment of an image decompression system, according to the present invention, will be described below.

The ninth preferred embodiment of the image decompression system corresponds to the fifth preferred embodiment of the image decompression system shown in FIG. 9. In FIG. 13, an image decompression system 20A comprises an LSI decompression part 24, and a memory including a decoded reference image storing part 16 and a compressed reference display image storing part 19.

In FIG. 13, the LSI decompression part 24 comprises: a third switch (SW3) 12 for selecting one of a compressed image stored in the compressed reference display image storing part 19 and an inputted compressed image; a decoding part 17 for decoding the compressed image, which has been selected by the third switch 12 to be inputted; an adder 5 for deriving a sum of the output of the decoding part 17 and the decoded reference image stored in the decoded reference image storing part 18; a first switch 6 for selecting one of the outputs of the adder 5 and the decoding part 17; a coding part 7 for coding any one of the outputs selected by the first switch 6; a second switch (SW2) 8 for selecting one of the compressed image outputted from the coding part 7 and the inputted compressed image to supply the selected compressed image to the compressed reference display image storing part 19.

The functions and advantages of the decoded reference image storing part 18 and the compressed reference display image storing part 19 are the same as those of the fourth preferred embodiment described above. This eighth preferred embodiment is characterized in that the respective elements other than the memory are formed as an LSI. The particular advantages obtained by the integration into the LSI are the same as those of the image decompression system in the sixth through eighth preferred embodiments.

In the sixth through ninth preferred embodiment described above, while only the respective elements other than the memory have been formed as the LSI, the present invention should not be limited thereto, but all of the elements including the memory may be formed as an LSI to provide an image decompression system. For example, as the tenth preferred embodiment of an image decompression system shown in FIG. 14, all of first and second decoding parts 3 and 4 forming decoding means 2, an adder 5, first and second switches 6 and 8, a coding part 7 and a compressed reference image storing part 9 may be formed as an LSI decompression part 25. In this case, although the memory occupies considerable area in the LSI, a reference image is compressed again to be stored according to the present invention, so that it is possible to considerably reduce the scale of the memory in comparison with the memory of the conventional image decompression system. Therefore, there is a probability that the compressed reference image storing part will be integrated into an LSI.

Figure 14:
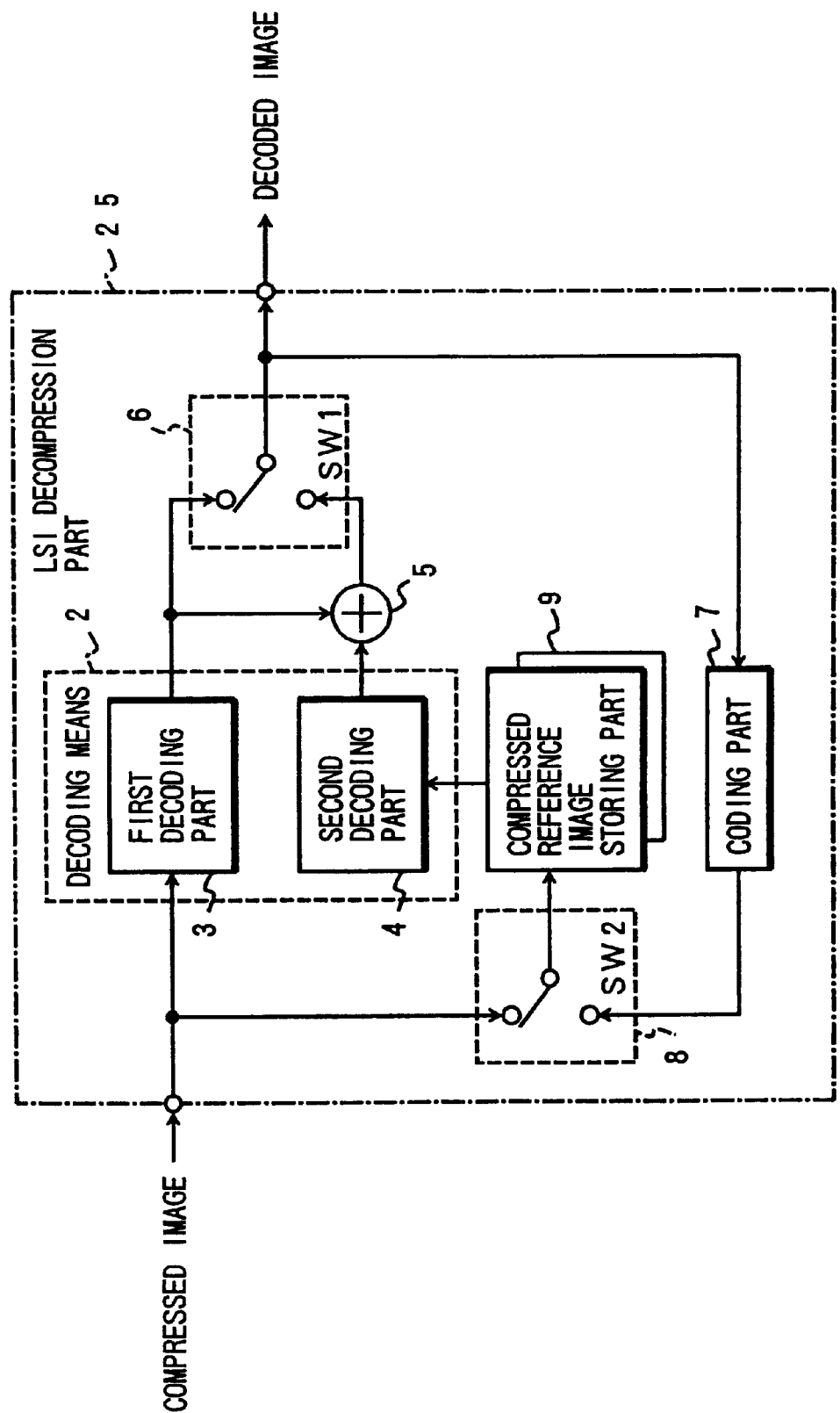
FIG. 14 is a block diagram of the tenth preferred embodiment of an image decompression system according to the present invention.

While the tenth preferred embodiment of the image decompression system has a construction corresponding to those of the first through sixth preferred embodiments, three types of preferred embodiments corresponding to the third and seventh preferred embodiments, the fourth and eighth preferred embodiments, and the fifth and ninth preferred embodiments can be easily made on the basis of the construction of FIG. 14, so that the detailed descriptions thereof are omitted.

What is claimed is:

1. An image decompression system comprising:
   a decoding circuit including at least one decoding part configured to decode an inputted compressed image using a decoding system inversely the same as a first coding system which produced the compressed image and configured to output a first decoded image together with a second decoded image;

a coding circuit configured to code said first decoded image using a second coding system inversely the same as said decoding system and configured to produce a compressed reference image which differs from the inputted compressed image and which is applied to said decoding circuit and decoded by said decoding circuit to produce the second decoded image;

an output circuit configured to output a final decoded image which is one of said first decoded image and a decoded image derived at least in part from the second decoded image.

2. An image decompression system as set forth in claim 1, which further comprises a compressed reference image storing circuit configured to store said compressed reference image, wherein said output circuit includes: an adder configured to add said first decoded image outputted from said decoding circuit to said second decoded image, which has been obtained by decoding said compressed reference image stored in said compressed reference image storing circuit; and a first switch configured to select one of said firs decoded image outputted from said decoding circuit and a decoded image outputted from said adder.

3. An image decompression system as set forth in claim 2, wherein said decoding circuit comprises;

a first decoding part configured to decode said inputted compressed image and a second decoding part configured to decode said compressed reference image, said first decoded image being decompressed by said first decoding part, compressed by said coding circuit, and stored in said compressed reference image storing circuit as a predictive reference image.

4. An image decompression system as set forth in claim 3, wherein said compressed reference image storing circuit has a second switch configured to receive the compressed reference image and the inputted compressed image and configured to select one of said compressed reference image and said inputted compressed image as inputs to the compressed reference image storing circuit.

5. An image decompression system as set forth in claim 4, which further comprises:

a display image storing part configured to store a compression image corresponding to a display image coded by said coding circuit; and a third switch configured to supply one of said inputted compressed image and said compression image to said first decoding part and said second switch.

6. An image decompression system as set forth in claim 1, wherein at least said decoding circuit, said coding circuit, and said output circuit are integrated to form an LSI decompression part of a large scale integrated circuit.

7. An image decompression system as set forth in claim 2, wherein said decoding circuit, said coding circuit, said output circuit, and said compressed reference image storing circuit are integrated to form an LSI decompression part of a large scale integrated circuit.

8. An image decompression system as set forth in claim 1, wherein said decoding circuit comprises:

a compressed reference image storing part configured to store said compressed reference image and the at least one decoding part is configured to receive and decode one of said inputted compressed image and said compressed reference image which is stored in said compressed reference image storing part and which has been produced by said coding circuit;

a decoded reference image storing part configured to store a decoded reference image decoded by said at least one decoding part; and said image decompression system further comprises;

a first switch configured to allow one of said compressed reference image and said inputted compressed image to be inputted to said compressed reference image storing part; and a second switch configured to allow one of an output of said compressed reference image storing part and said inputted compressed image to be inputted to said at least one decoding part.

9. An image decompression system as set forth in claim 8, wherein said compressed reference image storing part comprises a compressed reference display image storing part having a region configured to store a compressed display image obtained by coding, using said coding circuit, a display image which is outputted via said first switch.

10. An image decompression system as set forth in claim 8, wherein at least said at least one decoding part, said coding circuit, said output circuit and said first switch and second switch are integrated to form an LSI decompression part of a large scale integrated circuit (LSI).

11. An image decompression system as set forth in claim 10, wherein at least one of said compressed reference image storing part and said compressed reference display image storing part are integrated to be contained in said LSI decompression part.

12. An image decompression system as set forth in claim 1, wherein a coding system of said coding circuits is an intra-frame or intra-field coding system.

13. An image decompression system as set forth in claim 1, wherein said decoding circuit decodes said inputted compressed image together with an output of a compressed reference image storing part.

* * * * *